Jan. 24, 1950     C. L. BERNARDS ET AL     2,495,403
METHOD OF MANUFACTURING FROZEN CONFECTIONS
Filed July 30, 1947

INVENTORS
CLARENCE L. BERNARDS
ROBERT BERNARDS
PARLEY BERNARDS
BY Joseph B. Gardner
their attorney Patented Jan. 24, 1950

2,495,403

UNITED STATES PATENT OFFICE 2,495,403

METHOD OF MANUFACTURING FROZEN CONFECTIONS

Clarence L. Bernards, San Leandro, and Robert Bernards and Parley Bernards, Castro Valley, Calif., assignors to John M. Bernards & Sons, Inc., Ashland, Calif., a corporation of California Application July 30, 1947, Serial No. 764,728

3 Claims. (Cl. 99—137)

1

This invention relates to confections in which at least some of the components thereof are substantially frozen and constitutes an improvement over the confection disclosed in our prior application Serial Number 647,928, filed February 15, 1946, now abandoned.

An object of the invention is to provide a confection having a core portion, composed of suitably ripe and palatable fruit meat in its natural and unmodified state, enclosed and sealed within one or more envelopes of congealed normally fluid substances.

Another object of the invention is to provide a confection of the character described in which, although an envelope is brought to or below freezing temperature, the fruit core is not permitted to chill to the point where a portion or all of the body thereof will crystallize or solidify.

A further object of the invention is to provide a confection of the character referred to in which the fruit core both before and after its incorporation into the confection is so handled and shielded against prolonged contact with the air that oxidation of juices and pulp may not progress to the point where the flavor or the natural color of the fruit is adversely affected.

Still another object of the invention is to provide a confection of the nature described in which a somewhat yieldable cushioning layer of material is interposed between and bonded to a central unfrozen fruit core and to an outer comparatively thin surface coating of frangible material, the intermediate layer serving to retain fragments of the outer coating in place, should the latter become cracked due to handling or from other causes, and also as a sealing agent to prevent air from reaching the fruit core.

It is another object of the invention to provide an improved method of making confections of the type comprising a central core enclosed by one or more coatings of congealable material.

The invention possesses other objects and features of advantage, some of which, with the foregoing, will be set forth in the following description of the preferred form of the invention which is illustrated in the drawings accompanying and is to be understood, however, that variations in the showing made by the said drawings and description may be adopted within the scope of the invention as set forth in the claims.

Referring to the drawing:

Figure 1 is a side elevational view of the confection of the present invention.

2

Figure 1:
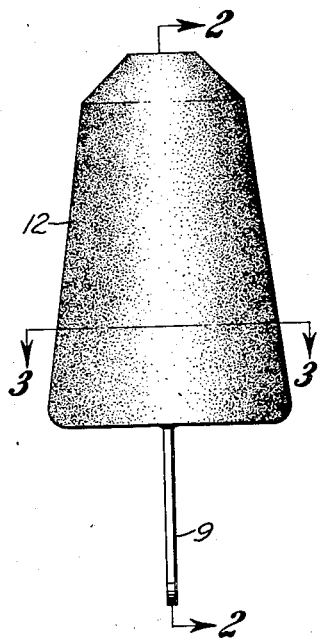
Figure 2:
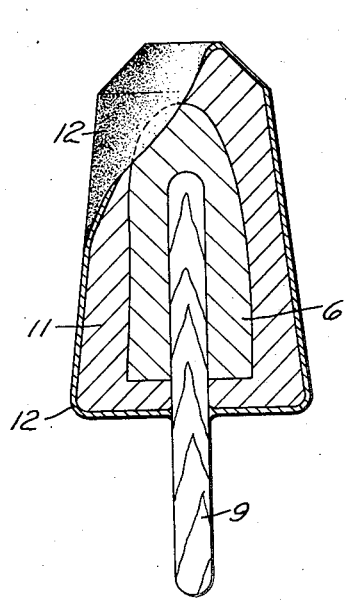
Figure 2 is a vertical sectional view taken in the plane indicated by the line 2—2 of Figure 1.
Figure 3:
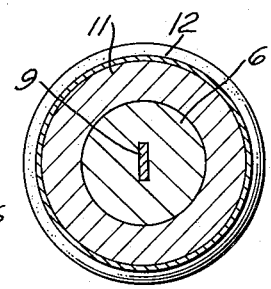
Figure 3 is a horizontal sectional view taken in the plane indicated by the line 3—3 of Figure 1.
Figure 4:
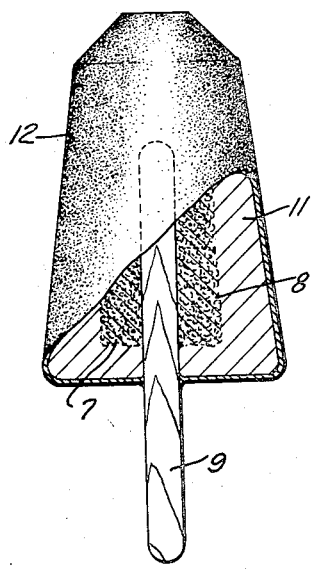
Figure 4 is a view of the confection, partly in side elevation and partly in vertical section, showing a modified form of core construction.

In Figure 2, the confection is shown as having a core 6 here illustrated as a solid section of banana although unitary or grouped portions of the latter or other fruits, berries or assortments thereof may be employed if desired. For example, fruit meats such as melon, peach, pear or pineapple may comprise the solid-piece category while berries or fragments of the above-disclosed fruits may comprise the grouped class of core as indicated in Figure 4. It is preferred to use all of the above substances, with the exception of the pineapple which should be cooked, in their raw although suitably ripe state and to size or arrange the cores so that each will possess substantially equivalent bulk. In the case of the grouped core it may be desirable to use a fruit or other gel 7 to bind together the berries or other fragments 8.

As here shown the core 6 is impaled on a stick 9, composed of wood or other suitable material, which is useful not only as a handle, whereby the consumer may manipulate the confection while eating it, but also as a grip by means of which the confection may be engaged or supported by the various process or transport devices associated with the manufacturing machinery. Although it is preferable to employ a handle member 9, as shown in the drawing, in the completed confection, the former or its equivalent is indispensable only in the manufacturing process after the completion of which it may be extracted and discarded or reused in the formation of succeeding confections. It will be seen therefore that it is within the scope of the invention to provide a salable confection suitably packaged with or without a stick holding member.

Certain fruits, particularly bananas and apples when divested of their skins and exposed to the air for only a short time, have the tendency to acquire highly undesirable surface discoloration which creates considerable hindrance to the sale of the products. It is a principal feature of the present invention to handle such fruits in a manner which will arrest and thereafter prevent such discoloration by immediately immersing the fruit, after the latter has been peeled, into a mass of edible sealing compound so as to enclose the core in a sealing envelope 11. A variety of materials may be employed for forming the envelope 11 such as fondant, custard, jam or jelly or substances of a like nature but it is preferable to use ice cream which is in a semi-frozen state and of such a consistency that, when the fruit core is immersed therein, the sealing material will readily engulf the core and form the envelope 11. While it is an entirely practical variation of the production method to form the sealing envelope 11 by dipping the core 6 into a mass of sealing material of the proper consistency and thereafter withdrawing the core with an adhering coating of the material, it is preferred, in order to produce confections of uniform size and shape, to place an adequate quantity of the sealing material in a mold cavity, immersing the core 6 therein as set forth above, congealing the sealing material to form-retaining consistency and thereafter separating the envelope-bearing core from the mold cavity. A further possible modification of the manufacturing procedure is to apply a coating of plastic form-retaining sealing material to the core by shaping the material around the core by hand.

After the sealing envelope 11 has been rendered form-retaining, one or more additional coatings 12 of similar or different material may be superposed on the envelope and after the outermost coating has set or hardened to a consistency which will permit handling of the confection, the latter may be placed in a bag or other package and stored prior to distribution or sale. A wide variety of materials may be employed for the final coating 12, such as fragmented nuts, cocoanut or the like with or without binding material such as marshmallow or heavy sugar syrup, but it is preferable to employ chocolate which has been reduced to fluid consistency, the confection dipped thereinto and thereafter allowed to set to a comparatively hard state. The outermost coating 12 should be of such structural strength and thickness as to resist the normal pressure of the fingers which may be imposed on the confection by the user. It has been found that a coating or ordinary candymaker's dipping chocolate having a thickness of about one sixty-fourth of an inch is satisfactory. It has further been found that small amounts of cocoa butter and lecithin added to the coating material lend desirable characteristics thereto, the latter element imparting sealing power to the coating which resists bleeding therethrough of moisture from the interior of the confection.

Figure 5:
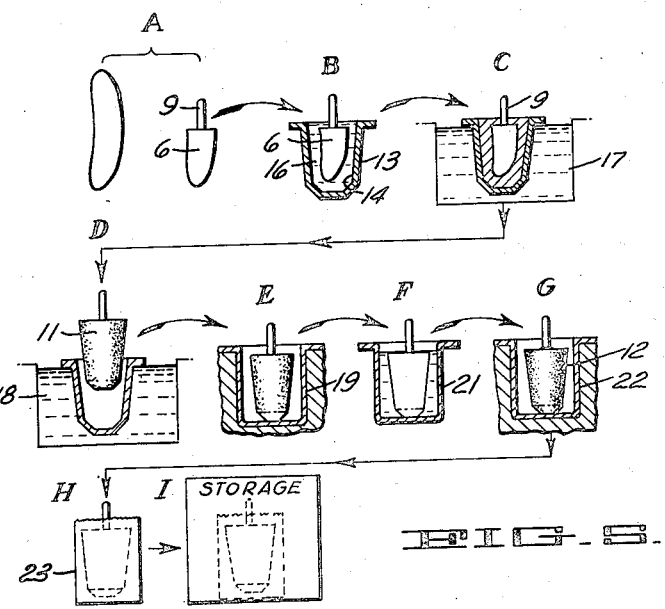
Figure 5 is a view, more or less diagrammatic in character, showing the various steps in the method of forming the confection.

In Figure 5 is shown a diagrammatic view illustrating the successive steps in carrying out a process of manufacturing the confection, the core being indicated as a banana since this fruit requires special handling and retains an unusual consistency in the finished confection. The first step A in the process requires peeling of the fruit whereupon it is promptly sized, to form the portion which will form the core 6, and is impaled upon the permanent or temporary processing stick 9. Immediately, that is, a matter of a few seconds after being peeled the core 6 is plunged into a mold 13 in the cavity 14 of which is contained the soft ice cream 16 which will compose the sealing layer 11. This latter action comprises step B in the process. It will be noted, and this is quite important, that the fruit 6 is at room temperature which may range, on an average, from about forty-five to about seventy-five degrees Fahrenheit. The temperature of the soft ice cream in the mold cavity may range from about twenty to thirty degrees Fahrenheit. Thus the untreated core, at the relatively higher temperature, when immersed in the much colder ice cream, loses a considerable amount of its heat and the temperature of the ice cream rises correspondingly. As soon as the core has been inserted and centralized in the mold, the latter is placed in a brine tank 17 operating at a temperature of about minus twenty degrees Fahrenheit for a period, usually about twenty minutes, sufficient to reduce the temperature of the ice cream to about eight degrees Fahrenheit or to the point where it is hard and form-retaining. At this point C in the process, tests have shown that although the ice cream layer is very cold, ranging from eight to fifteen degrees Fahrenheit, the temperature of the banana at its center is much higher and may range from about twenty-five to about thirty-five degrees Fahrenheit depending upon the length of immersion of the mold in the brine. The exact reason for the temperature gradient is not entirely clear but it is believed that the banana has much poorer heat conductivity than the ice cream and consequently the latter relinquishes its heat much faster and becomes desirably firm before the fruit core can chill excessively.

When the sealing layer has become desirably firm, the mold is heated, such as by partial immersion in the tank 18 of warm water, until the ice cream lying contiguously adjacent the cavity surface of the mold softens to the point where the confection so far constructed may be lifted and separated from the mold. Such action comprises step D of the process. Immediately upon being stripped from the mold, the partially-completed confection is taken through step E of the process by being placed in a chill chamber 19 whose temperature is maintained in a range of from zero to five degrees Fahrenheit for a time, usually one or two minutes, only sufficient to re-harden the surface layer of ice cream which has softened during the separation of the confection from the mold. After removal from the chamber 19 the confection is supplied with its outer coating, in this case indicated as chocolate or the like, by immersion in a container 21 of the softened coating material. Such immersion comprising step F of the process, is done fairly rapidly, and results in the coating material clinging to the confection, after the latter is withdrawn from the bath, being practically instantly congealed and hardened by the rapid extraction of heat from the coating by the cold materials enveloped thereby. After being provided with its external coating the confection is next treated, in step G of the process, by being placed in a second chill chamber 22 also maintained in a temperature range of from zero to about five degrees Fahrenheit until suitable hardening of the ice cream layer, which immersion in the warm solution of coating material may have softened, takes place. This time interval usually does not extend beyond a few minutes after which the finished confection is placed in a bag or other package 23, comprising step H of the process, and finally stored in a refrigerated space I in which the confection awaits distribution or sale. The storage comprises the final step J of the process and the temperature of the chamber preferably ranges from five to twelve degrees Fahrenheit at which temperature the confections will be maintained in a desirably firm condition and yet not cold enough to cause any excessive and uncomfortable chilling of the teeth and mouth of the consumer.

It has been found that the fruit cores of the confections above described which have been introduced in the process at ordinary room temperature are at no time, either during the processing or at the end of a reasonable storage period, which does not ordinarily exceed forty-eight hours between the time when the confection is completed and the time that it is sold to the consumer, completely frozen to the point wherein there is such a preponderance of ice crystals therein that the consumer experiences the sensation of crunchiness while eating the product. In fact experience has shown that the fruit, aside from the fact that it is very cold, has a texture not perceptibly altered, other than its degree of softness, from that of its room-temperature state.

It has further been found that the intermediate ice cream or sealing layer of the confection, although being comparatively firm, still has sufficient resilience to cushion the relatively frangible outer coating of chocolate or the like, so that the latter is capable of withstanding, without cracking and flaking off, the ordinary finger pressures of the packers or consumers which may be imposed thereon in the normal course of handling.

We claim:

1. A method of manufacturing a frozen confection bar which comprises preparing a substantially solid core of fruit, immediately immersing said core at about room temperature in a first zone in a fluid ice cream mix, the quantity of which is equal to that to be included in the finished confection bar, said mix being maintained at a temperature below about 30° F., said ice cream mix being congealable to a solid at a lower temperature, cooling said mix in a second zone maintained at a temperature sufficient to rapidly reduce the temperature of the mix to a point at which it is form-retaining and whereby the core is completely surrounded by the ice cream, removing the solid article thus formed from the second zone, thereafter super-cooling the article in a third zone to harden the exterior, immediately dipping the article thus produced into a fluid edible coating material to deposit a thin coat of said material over the entire exterior of the ice cream, then super-cooling the article in a fourth zone to harden the exterior, removing the confection thus formed from said fourth zone, and thereafter maintaining the confection at a temperature at which the coating material and ice cream are in frozen condition.

2. The process of claim 1 in which the core is banana.

3. The process of claim 1 in which the coating material comprises chocolate.

CLARENCE L. BERNARDS.
ROBERT BERNARDS.
PARLEY BERNARDS.

REFERENCES CITED

The following references are of record in the file of this patent:

UNITED STATES PATENTS

| Number | Name | Date |
|---|---|---|
| 1,718,997 | Burt | July 2, 1929 |
| 1,893,842 | Nehf | Jan. 10, 1933 |
| 1,917,137 | Marchio | July 4, 1933 |
| 1,935,735 | Chauvin | Nov. 21, 1933 |

OTHER REFERENCES

"The Novelty Parade," The Ice Cream Review, October, 1942, page 80.